US007246496B2

(12) United States Patent
Goenka et al.

(10) Patent No.: US 7,246,496 B2
(45) Date of Patent: Jul. 24, 2007

(54) THERMOELECTRIC BASED HEATING AND COOLING SYSTEM FOR A HYBRID-ELECTRIC VEHICLE

(75) Inventors: Lakhi N. Goenka, Ann Arbor, MI (US); Douglas T. Crane, Pasadena, CA (US); Lon E. Bell, Altadena, CA (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 111 days.

(21) Appl. No.: 11/184,447

(22) Filed: Jul. 19, 2005

(65) Prior Publication Data

US 2007/0033951 A1 Feb. 15, 2007

(51) Int. Cl.
*F25B 21/02* (2006.01)

(52) U.S. Cl. ................. 62/3.3; 62/3.7; 165/104.21; 136/204

(58) Field of Classification Search ............ 62/3.3, 62/3.61, 3.7, 96, 99, 244, 160, 238.7, 324.1, 62/430, 435; 165/41, 104.21, 42, 104.34
See application file for complete search history.

(56) References Cited

U.S. PATENT DOCUMENTS

| 3,138,934 | A | | 6/1964 | Roane |
| 4,402,188 | A | * | 9/1983 | Skala ............................. 62/56 |
| 4,848,090 | A | * | 7/1989 | Peters .......................... 62/3.3 |
| 4,922,721 | A | * | 5/1990 | Robertson et al. ........... 62/3.61 |
| 5,092,129 | A | * | 3/1992 | Bayes et al. .................. 62/3.3 |
| 5,713,426 | A | | 2/1998 | Okamura |
| 6,122,588 | A | * | 9/2000 | Shehan et al. ................ 701/93 |
| 6,203,939 | B1 | | 3/2001 | Wilson |
| 6,230,496 | B1 | | 5/2001 | Hofmann et al. |
| 6,324,860 | B1 | * | 12/2001 | Maeda et al. ................. 62/271 |
| 6,554,088 | B2 | * | 4/2003 | Severinsky et al. ........ 180/65.2 |
| 6,605,773 | B2 | | 8/2003 | Kok |
| 6,611,115 | B2 | * | 8/2003 | Wakashiro et al. ......... 318/139 |
| 6,705,089 | B2 | * | 3/2004 | Chu et al. ..................... 62/3.2 |
| 6,722,139 | B2 | * | 4/2004 | Moon et al. .................. 62/3.2 |
| 6,792,259 | B1 | | 9/2004 | Parise |
| 6,796,399 | B2 | | 9/2004 | Satou et al. |
| 6,803,766 | B2 | | 10/2004 | Kobayashi et al. |
| 6,880,346 | B1 | * | 4/2005 | Tseng et al. .................. 62/3.7 |
| 6,907,739 | B2 | * | 6/2005 | Bell ............................ 62/3.7 |
| 7,089,756 | B2 | * | 8/2006 | Hu ............................... 62/435 |
| 2004/0237541 | A1 | | 12/2004 | Murphy |
| 2004/0267408 | A1 | | 12/2004 | Kramer |
| 2005/0067862 | A1 | | 3/2005 | Iqbal et al. |
| 2005/0072165 | A1 | | 4/2005 | Bell |

(Continued)

FOREIGN PATENT DOCUMENTS

DE     199 51 224     5/2001

(Continued)

*Primary Examiner*—Mohammad M. Ali
(74) *Attorney, Agent, or Firm*—Brinks Hofer Gilson & Lione (57) ABSTRACT

A heating and cooling system including a first and second thermoelectric module each has a first surface and a second surface. In thermal communication with the first and second surfaces of the thermoelectric modules are separate heat exchangers. A thermal storage device is in thermal communication with the first surface of the second thermoelectric module. The thermal storage device is configured to store thermal energy generated by the second surface of the second thermoelectric module.

18 Claims, 3 Drawing Sheets

U.S. PATENT DOCUMENTS

2005/0074646 A1 4/2005 Rajashekara et al.
2005/0081834 A1 4/2005 Perkins

FOREIGN PATENT DOCUMENTS

| | | |
|---|---|---|
| DE | 10 2005 024 074 | 12/2005 |
| DE | 10 2005 022 656 | 3/2006 |
| FR | 2 806 666 | 9/2001 |
| JP | 9-89284 A * | 4/1997 |
| JP | 10-035268 | 2/1998 |
| WO | WO 99/10191 | 3/1999 |

\* cited by examiner

THERMOELECTRIC BASED HEATING AND COOLING SYSTEM FOR A HYBRID-ELECTRIC VEHICLE

BACKGROUND OF THE INVENTION

1. Field of the Invention

The present invention generally relates to heating, ventilation and air conditioning ("HVAC") systems for an occupant compartment of a hybrid-electric vehicle, and more particularly to HVAC systems having thermoelectric modules for providing heating and cooling to the occupant compartment of the hybrid-electric vehicle.

2. Description of the Known Technology

A hybrid-electric vehicle uses an electric motor in conjunction with a conventional internal combustion engine to create torque to drive its wheels. When the driver of the hybrid-electric vehicle applies the brakes, the hybrid-electric vehicle reverses the function of the electric motor, thus, turning the electric motor into an electric generator. As the hybrid-electric vehicle approaches the stop, the wheels of the hybrid-electric vehicle, in conjunction with the electric motor acting as an electric generator, generate a pulse of electricity. This pulse of electricity is stored in an energy storage unit such as a capacitor and later used to drive the wheels and/or power the vehicle accessories, such as the HVAC system. However, when storing the pulse of electricity, some of the electricity is lost due to parasitic losses.

When the hybrid-electric vehicle is at a stop, it is common for the hybrid-electric vehicle to shut down its internal combustion engine. However, when the HVAC system of the hybrid-electric vehicle is in operation, the hybrid-electric vehicle may have to drain the energy storage device and/or keep the internal combustion engine operating in order to keep the HVAC system running. These demands will minimize fuel economy.

Therefore, it is desired to provide a more efficient system for providing heating and cooling to the occupant compartment of the hybrid-electric vehicle, while maximizing the storage of the pulse of electricity generated during braking,

BRIEF SUMMARY OF THE INVENTION

In overcoming the drawbacks and limitations of the known technologies, a system for heating and cooling the occupant compartment of a vehicle is disclosed. The heating and cooling system includes a two thermoelectric module each having a hot surface and a cool surface. The hot and cool surfaces may operate in a mode such that the hot surface is cool and the cool surface is hot. In thermal communication with each of the hot and cool surfaces are separate heat exchangers. A heat storage device is in thermal communication with the hot or cools surface of one of the thermoelectric modules and stores thermal energy generated by that thermoelectric module.

In communication with the thermoelectric modules is a logic device. The logic device is configured to receive a regenerative pulse generated during regenerative breaking. The logic device will direct the pulse to either the thermoelectric module coupled to the heat storage device or to an energy storage device, such as a capacitor.

The system may further include fluid circuits, each having a pump for circulating a medium therethrough. One circuit is in thermal communication with the cool sides of both thermoelectric modules. Another circuit is in thermal communication with one of the hot sides of the thermoelectric modules and third circuit is in thermal communication with the hot side of the other thermoelectric module.

These and other advantages, features and embodiments of the invention will become apparent from the drawings, detailed description and claims which follow.

DETAILED DESCRIPTION OF THE INVENTION

Figure 1:
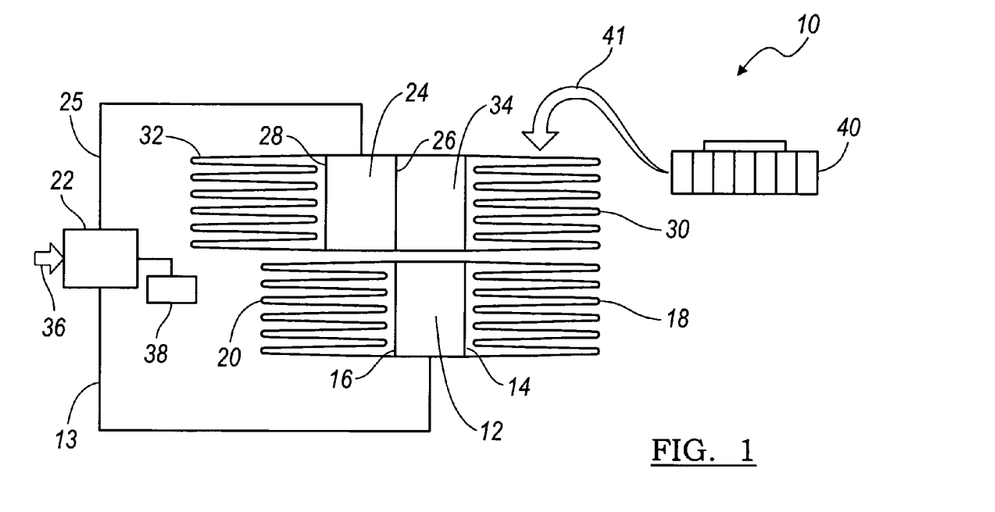
FIG. 1 is a block diagram of an HVAC unit embodying the principles of the present invention.

Referring to FIG. 1, the various components of a HVAC unit 10 according to one embodiment of the present invention are shown. The HVAC unit 10 includes a first thermoelectric module 12 having a hot surface 14 and a cool surface 16. Each of the hot and cool surfaces 14, 16 is in thermal communication with a heat exchanger, respectively designated at 18, 20. Preferably, the heat exchangers 18, 20 are in the form of heat sinks.

In the context of this description, the term "thermoelectric module" is used in the broad sense of its ordinary and customary meeting, which is (1) conventional thermoelectric modules, such as those produced by Marlow Industries, Inc. of Dallas, Tex., (2) quantum tunneling converters, (3) thermionic modules, (4) magneto caloric modules, (5) elements utilizing one, or any bi-combination of, thermoelectric, magneto caloric, quantum tunneling and thermionic effects, (6) acoustic heating mechanisms, (7) thermoelectric systems described is U.S. Pat. No. 6,539,725 to Bell, (8) any other sold state heat pumping device (9) any combination, array, assembly and other structure of (1) through (8) above.

The HVAC system 10 further includes a second thermoelectric module 24 having hot and cool surfaces 26, 28. The cool surface 28 of this second thermoelectric module 24 is in thermal communication with a heat exchanger 32, similarly constructed as those previously described. Between the hot surface 26 and its respective first heat exchanger 30, is a thermal storage device 34 thermally connecting the hot surface 26 with its heat exchanger 32, which is also similarly constructed as those previously described.

The thermal storage device 34 is preferably a container having a mixture of both high and low temperature phase change materials. The mixture may contain wax (a high temperature phase change material) and water (a low temperature phase change material). When in operation, thermal energy generated by the hot surface 26 or portion thereof is stored in the thermal storage device 34.

A HVAC control system 22 is in electrical communication with the thermoelectric modules 12, 24 via lines 13, 25, respectively. The HVAC control system 22 provides the first thermoelectric module 12 with an electrical current that can be adjusted with regard to the amount and direction of the flow of the current provided to the thermoelectric module 12. In a heating mode, the direction of the current flowing through the first thermoelectric module 12 will be such that the hot surface 14 of the thermoelectric module 12 warms, while the cool surface 16 of the first thermoelectric module 12 cools. The hot surface 14 transfers the heat to the first heat exchanger 18, while the cold generated by the cool surface 16 is dissipated by the second heat exchanger 20. In a cooling mode, the reverse occurs with the "hot" surface 14 of the thermoelectric module 12 cools, while the "cool" surface 16 the first thermoelectric module 12 warms.

The HVAC control system 22 is further configured to receive an electrical pulse (as indicated by the arrow labeled 36). Preferably, the electrical pulse is generated by a hybrid-electric vehicle during regenerative braking, but may be generated by other systems. The electrical pulse is received by the HVAC control system 22 and is directed to the second thermoelectric module 24 and/or an energy storage device 38, such as a capacitor. The electricity stored in the energy storage device 38 may be later used to provide power to the electric motor driving the wheels or accessories of the hybrid electric vehicle. The HVAC control module 22 may direct the electrical pulse to either to the second thermoelectric module 24 and/or the energy storage device 38 based upon the thermal capacity of the thermal storage device 34 and/or the thermal needs of the occupant compartment of the hybrid-electric vehicle.

In the context of this description, the term "hybrid-electric vehicle" is used in the broad sense of its ordinary and customary meeting, which is (1) a vehicle powered only by an electric motor, (2) a fuel cell powered vehicle, (3) any type of vehicle utilizing electric motors to directly or indirectly power the vehicle or (4) any vehicle with an electric generator.

When the HVAC control system 22 directs the electrical pulse to the second thermoelectric module 24, the HVAC control system 22 controls the flow direction of the current generated by the electrical pulse. By controlling the flow direction of the current, the hot surface 26 will either heat or cool. In a heating mode, the direction of the current flowing through the second thermoelectric module 24 will be such that the hot surface 26 of the second thermoelectric module 24 warms (transferring the heat generated by to the first heat exchanger 30 and the thermal storage device 34), while the cool surface 28 of the second thermoelectric module 24 cools. In a cooling mode, the reverse occurs with the previously "hot" surface 26 of the second thermoelectric module 24 cooling, while the previously "cool" surface 28 of the second thermoelectric module 24 heating.

As stated earlier, the HVAC control system 22 may direct the electrical pulse to either the second thermoelectric module 24 or the energy storage device 38. Typically, if the electrical pulse is directed to the energy storage device 38, the occupant compartment of the vehicle is not in need of further heating or cooling. If the electrical pulse is directed to the second thermoelectric module 24, it is likely that the occupant compartment of the vehicle is in need of further heating or cooling. By directing the electrical pulse to the second thermoelectric module 24, the HVAC control system 22 may lower the amount of current directed to the first thermoelectric module 12 since the second thermoelectric module 24 and the thermal energy stored in the thermal storage device 34 will provide sufficient heating or cooling to the occupant compartment. By reducing the current demands of the first thermoelectric module 12, the hybrid-electric vehicle may be able to shut off its internal combustion engine and/or reduce the drain on the energy storage device 38, thereby increasing the fuel efficiency of the hybrid-electric vehicle.

In order to provide heating and cooling to the occupant compartment of the vehicle, the first heat exchangers 18, 30 are located near a blower 40. The blower 40 moves air through and across the first heat exchangers 18, 30 (as indicated by the arrow labeled 41) and eventually into the occupant compartment of the vehicle.

Figure 2:
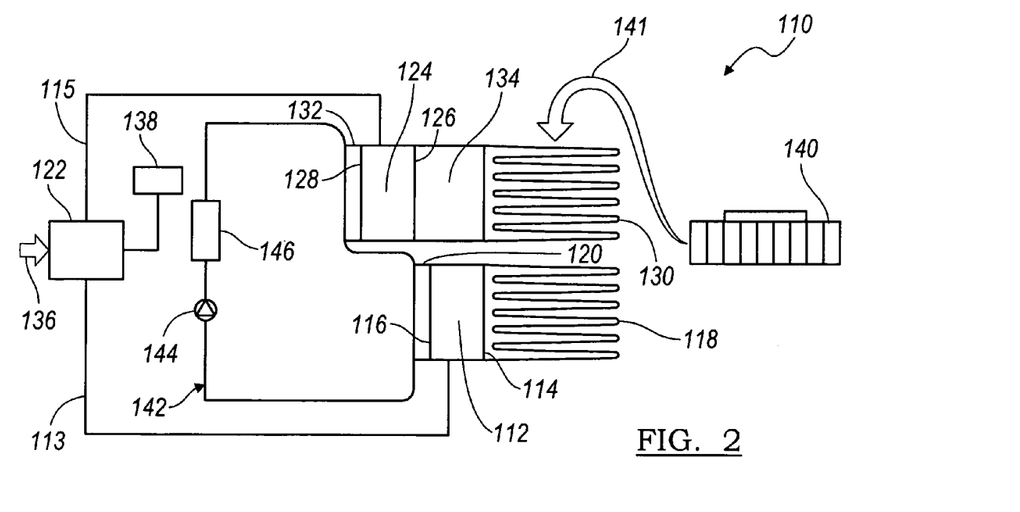
FIG. 2 is a block diagram of a second embodiment of an HVAC unit according to the principles of the present invention and including a circuit having a pump for circulating a medium therethrough.

Referring to FIG. 2, another HVAC unit 110 embodying the present invention is shown therein. The HVAC unit 110 includes a fluid circuit 142 having a pump 144 and a circuit heat exchanger 146. Accordingly, the first pump 144 circulates a fluid medium through the fluid circuit 142 and the fluid circuit heat exchanger 146.

In the context of this description, the term "pump" is used in its broad sense of its ordinary and customary meaning and further includes any conventional pump, electrostatic pump, centrifugal pump, positive displacement pump, gear pump, peristaltic pump or any other medium moving device or combination thereof that is known or later developed.

Generally, the fluid medium is a liquid having a mix of water and glycol. Alternatively, the fluid medium may be another fluid, such as gas or multipurpose solid-liquid convection medium.

The HVAC unit 110 further includes a thermoelectric module 112 having a hot surface 114 and a cool surface 116. The hot and cool surfaces 116, 118 are each in thermal communication with a heat exchangers 118, 120, respectively. Preferably, the heat exchanger 118 associated with the hot surface 114 is a finned heat exchanger or heat sink. The other heat exchanger 120 is configured to place the cool surface 116 in thermal communication with the fluid circuit and, therefore, the fluid circuit heat exchanger 146.

The HVAC system 110 further includes a second thermoelectric module 124 having hot and cool surfaces 126, 128. The hot and cool surfaces 126, 128 of the second thermoelectric module 124 are each in thermal communication with heat exchangers 130, 132, respectively. As in the previous embodiment, a thermal storage device 134 is located between the hot surface 126 of the second thermoelectric module 124 and its associated heat exchanger 130, which is preferably a finned heat exchanger or heat sink. The thermal storage device 134 is similar to the thermal storage device 34 shown in FIG. 1. The other heat exchanger 134 associated with the cool surface 116 places the cool surface 116 in thermal communication with the fluid circuit heat exchanger 146 via the fluid medium.

Also similar to the previous embodiment, a HVAC control system 122 is in electrical communication with the thermoelectric modules 112, 124 via lines 113, 115, respectively. The HVAC control system 122 provides the thermoelectric module 112 with an electrical current and can adjust the amount of current and direction of the flow of the current provided to the this thermoelectric module 112. In a heating mode, the direction of the current flowing through this thermoelectric module 112 will be such that the hot surface 114 of the thermoelectric module 112 warms, while the cool surface 112 of the thermoelectric module 112 cools. Heat generated by the hot surface 114 is transferred to the associated heat exchanger 118, while the cold generated by the cool surface 112 is dissipated by the fluid circuit heat exchanger 146 via the fluid medium. In a cooling mode, the reverse occurs with the previously "hot" surface 114 of the thermoelectric module 112 cooling, while the previously "cool" surface 116 the thermoelectric module 112 warming.

The HVAC control system 122 is configured to receive an electrical pulse (as indicated by the arrow labeled 136). Preferably, the electrical pulse is generated by a hybrid-electric vehicle during regenerative braking. The electrical pulse is received by the HVAC control system 122 and is directed to the second thermoelectric module 124 and/or an energy storage device 138, such as a capacitor, where it may be later used to provide power to the wheels or accessories of the hybrid-electric vehicle. The HVAC control module 122 may direct the electrical pulse to either to the second thermoelectric module 124 and/or the energy storage device 138 based upon the thermal capacity of the thermal storage device 134 and/or the thermal needs of the occupant compartment of the hybrid-electric vehicle.

When the HVAC control system 122 directs the electrical pulse to the second thermoelectric module 124, the HVAC control system 122 controls the direction of the flow of the generated by the electrical pulse. By controlling the direction of the flow of the current, the hot surface 126 of the second thermoelectric device 124 will either warm or cool, respectively in a heating mode and a cooling mode. In the heating mode, the hot surface 126 transfers the generated heat by the second thermoelectric module 124 to its associated the first heat exchanger 130 and the thermal storage device 134. The cold generated by the cool surface 128 of the second thermoelectric module 126 is dissipated by the fluid medium via the fluid circuit heat exchanger 146. In a cooling mode, the reverse occurs with the previously "hot" surface 126 cooling the previously "cool" surface 125 heating.

The heat exchangers 118, 130 associated with surfaces 114,126 are preferably located near a blower 140. The blower 140 is configured to move air through and across the heat exchangers 118, 130 (as indicated by the arrow labeled 141) and eventually into the occupant compartment of the vehicle.

As stated earlier, the HVAC control system 122 may direct the electrical pulse to either the second thermoelectric module 124 or the energy storage device 138. By directing the electrical pulse to the second thermoelectric module 124, the HVAC controls system 22 may lower the amount of current directed to the first thermoelectric module 112, thus reducing the current demands of the first thermoelectric module 112.

Figure 3:
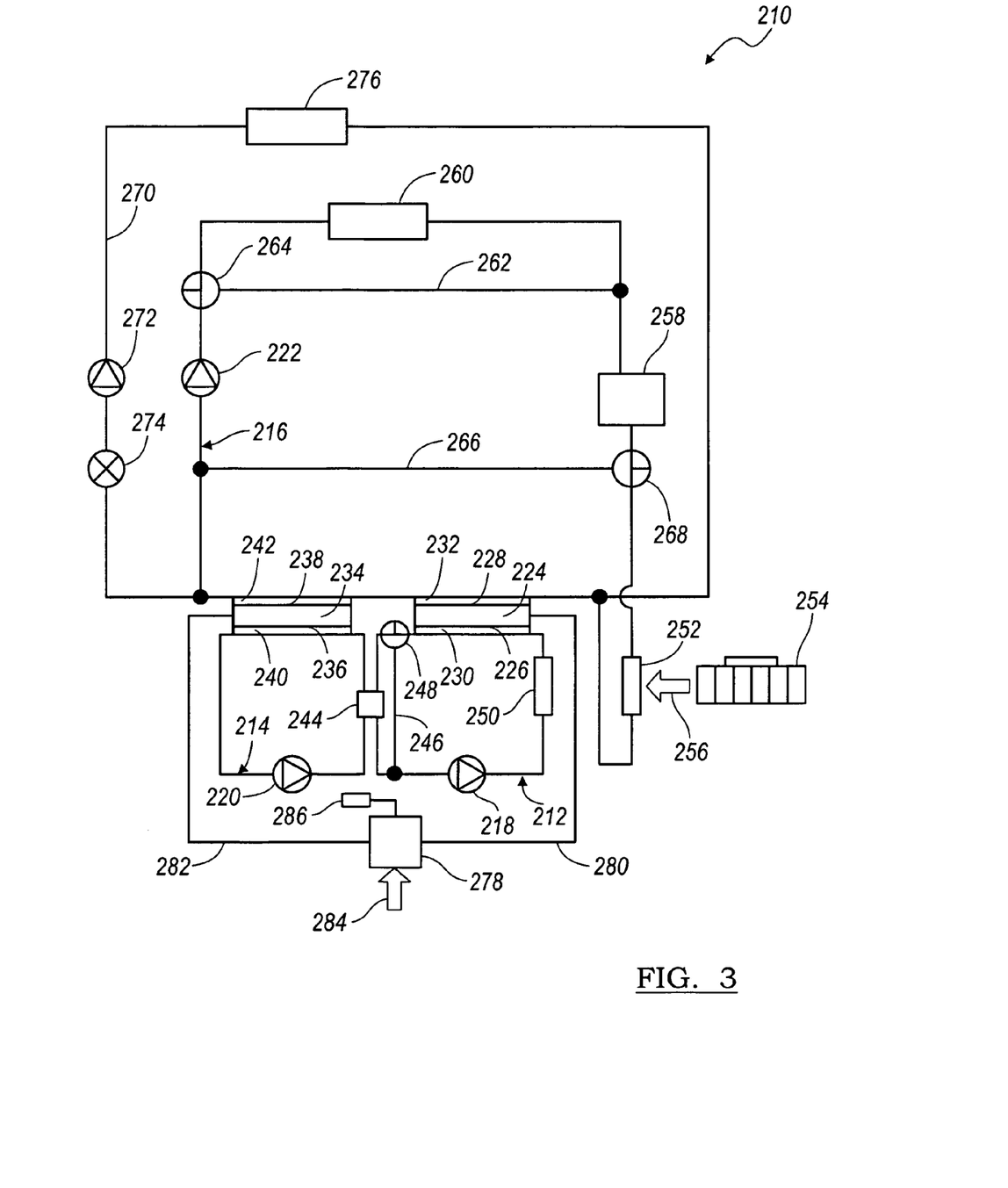
FIG. 3 is a block diagram of a third embodiment of an HVAC unit according to the principles of the present invention and including multiple circuits.

Referring now to FIG. 3, another embodiment of a HVAC unit 210 is shown. The HVAC 210 unit includes three fluid circuits 212, 214 and 216. The circuits 212, 214, 216 each have a pump 218, 220, 222 for circulating fluid medium through the first, second and third circuits 212, 214, 216, respectively.

Located between the first and third circuits 212, 216 is a thermoelectric module 224 having a hot surface 226 and a cool surface 228 in thermal communication with the first and third circuits 218, 222 via heat exchangers 230, 232, respectively.

A second thermoelectric module 234 is located between the second and third circuits 214, 216. The second thermoelectric module 234 has a hot surface 236 and a cool surface 238 in thermal communication with the second and third circuits 214, 216 via heat exchangers 240, 242, respectively.

Connected to both the first circuit 212 and second circuit 214 is a thermal storage device 244. The thermal storage device 244 is a reservoir which mixes the first and second medium such that thermal energy or portion thereof will be transferred between the first and second mediums. A bypass line 246 and a double switching valve 248 are connected to the first circuit 212 and are configured to selectively prevent the first medium from entering the thermal storage device 244 and mixing with the second medium.

Connected to the first and third circuits 212, 216 are heat exchangers 250, 252, both of which are used to condition (heat or cool) air to be provided to the occupant compartment of the vehicle. Accordingly, approximate to the heat exchangers 250, 252 is a blower 254. As indicated by the arrow 256, the blower 254 moves air through and across the heat exchangers 250, 252 before moving the air into the occupant compartment of the vehicle.

An internal combustion engine 258 is operatively coupled with the third circuit 216 such that the third medium is circulated by the pump 222 and is used to cool the engine 258. Preferably, the third circuit 216 has a radiator 260, for cooling the third medium within the third circuit 216. A bypass line 262 and a double switching valve 264 are connected to the third circuit 216 such that the double switching valve 262 can selectively direct the first medium through the bypass line 264 instead of the radiator 260. By circulating the third medium through the bypass line 264 instead of the radiator 260, the third medium can be heated more quickly by the engine 258 because the radiator 260 will not have an opportunity to cool the third medium.

The third circuit 216 may also have an additional bypass line 266 and a double switching valve 268. The double switching valve 268 can selectively direct the third medium through the bypass line 266 (during cooling mode operation) instead of through a section of the third circuit that is in thermal contact with the heat exchangers 232, 242. By circulating the third medium through the bypass line 266, the third medium will be unable to transfer heat to the heat exchangers 232, 242, and thus air provided by the blower 254 will not be heated by the engine 258 by the heat exchanger 252. Additionally, the temperature of the cool surfaces 228, 238 of the first and second thermoelectric modules 224, 234 will not be affected by the third medium. This can be advantageous when the HVAC is cooling the occupant compartment of the vehicle.

Generally, the third circuit 216 will have a branch circuit 270 having its own pump 272, valve 224 and heat exchanger 276. The branch circuit 270 is used to supplement the cooling of a portion of the third medium. For example, when the valve 274 is configured to allow a portion of the third medium to flow through the branch circuit 270, the heat exchanger 276 of the branch circuit 270 will aid in the cooling of the third medium. Conversely, when the valve 274 is configured to prevent the third medium from circulating through the branch circuit 270, the heat exchanger 276 will not supplement the cooling of the third medium.

A HVAC control system 278 is in electrical communication with the first and second thermoelectric modules 224, 234 via lines 280, 282, respectively. The HVAC control system 278 provides the first thermoelectric module 224 with an electric current. The HVAC control system 278 can adjust the amount of current, and the direction of the flow of the current, provided to the first thermoelectric module 224. In a heating mode, the direction of the current flowing through the first thermoelectric module 224 is such that as the hot surface 226 warms, the cool surface 228 cools. In a cooling mode, the reverse occurs with the "hot" surface 226 of the thermoelectric module 224 cools, while the "cool" surface 228 the first thermoelectric module 224 warms. As the hot surface 226 warms or cools, thermal energy is transferred from the hot surface 226 to the heat exchanger 230 via the first medium.

As stated previously, the HVAC control module 278 is also an electrical communication with the second thermoelectric module 234. The HVAC control system 278 is configured to receive an electrical pulse (as indicated by the arrow labeled 284), that may be generated by a hybrid-electrical vehicle during regenerative breaking. Electrical pulses received by the HVAC control system 278 may be directed to the second thermoelectric module 234 and/or an energy storage device 286, such as a capacitor. The HVAC control module 278 may direct the electrical pulse to either to the second thermoelectric module 234 and/or the energy storage device 286 based upon the thermal capacity of the thermal storage device 244 and/or the thermal needs of the occupant compartment of the hybrid-electric vehicle.

As the engine 258 warms up, the engine 258 heats the third medium that is circulated through the heat exchangers 232, 242. The heat of the third medium is passed through the heat exchangers 232, 242 to the cool surfaces 228, 238 of the first and second thermoelectric modules 224, 234. By warming the cool surfaces 228, 238 of the thermoelectric modules 224, 234, the difference in temperature between the hot surfaces 226, 236 and cool surfaces 228, 238 will be minimized, allowing the first and second thermoelectric modules 224, 234 operate more efficiently.

In a cooling mode, the third medium is directed through the second bypass line 266 by the second double switching valve 268. By utilizing the second bypass line 266, the heat of third medium is not directed through the heat exchangers 232, 242 and subsequently to the cool surfaces 228, 238 of the first and second thermoelectric modules 224, 234. The temperature of the cool surfaces 228, 238 of the thermoelectric modules will therefore not be heated, remaining closer in temperature to the hot surfaces 226, 236. As stated before, by having a low temperature differential between the hot surfaces 226, 236 and cool surfaces 228, 238, the first and second thermoelectric modules 224, 234 will operate more efficiently.

As thermal energy is transferred to the first and second mediums, the thermal energy from the first and second mediums will be mixed/stored in the thermal storage device 244. As the thermal storage device 244 stores more thermal energy, the HVAC control unit 278 may be able to reduce the amount of current flowing through the first thermoelectric device 224 because the occupant compartment of the vehicle will be able to be heated or cooled by the thermal energy stored within the thermal storage device 244.

By reducing the current demands of the first thermoelectric module 224, the hybrid-electric vehicle may be able to shut off its internal combustion engine and/or reduce the drain on the energy storage device 286, thereby increasing the fuel efficiency of the hybrid-electric vehicle.

Figure 4:
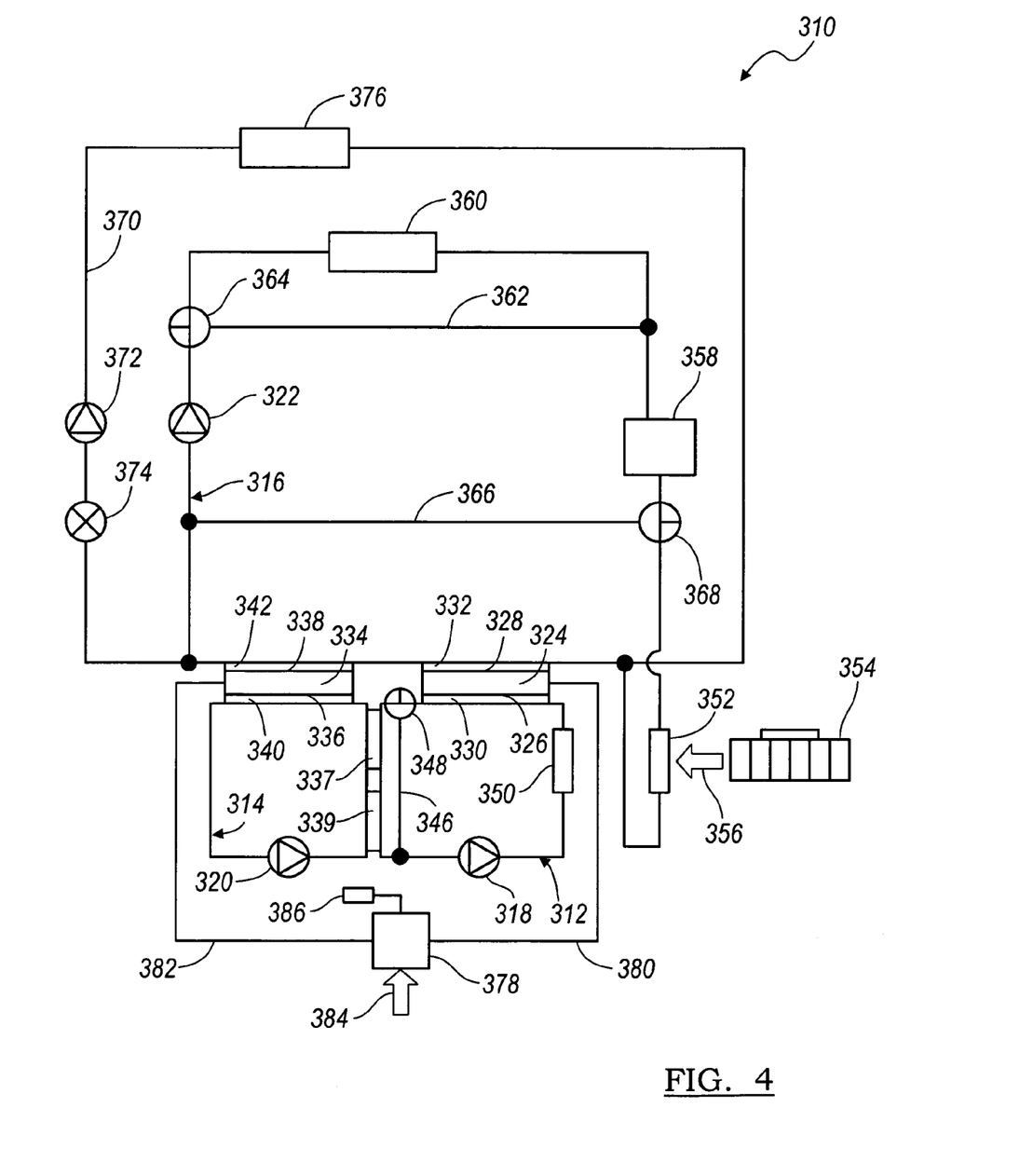
FIG. 4 is a block diagram of a variation of the embodiment of the HVAC unit shown in FIG. 3, which includes a high temperature thermal storage device and a low temperature thermal storage device.

Referring now to FIG. 4, another embodiment of a HVAC unit 310 is shown. The HVAC 310 unit includes a fluid circuit 312, a second fluid circuit 314 and a third fluid circuit 316. The circuits 312, 314, 316 each have a pump 318, 320, 322 for circulating a first, a second and third medium through the circuits 312, 314, 316, respectively.

Located between the first and third circuits 312, 316 is a first thermoelectric module 324 having a hot surface 326 and a cool surface 328. The first and cool surfaces 324, 326 of the first thermoelectric module 324 are in thermal communication with the first and third circuits 318, 322 via heat exchangers 330, 332, respectively.

A second thermoelectric module 334 is located between the second and the third circuits 314, 316. The second thermoelectric module 334 has a hot surface 336 and a cool surface 338 in thermal communication with the second circuit third circuits 214, 316 via heat exchangers 340, 342, respectively.

In thermal communication with both the first circuit 312 and second circuit 314 are a high temperature thermal storage device 337 and a low temperature thermal storage device 339. The high temperature thermal storage device 337 contains a phase change material, such as wax, while the low temperature thermal storage device contains a low temperature phase change material, such as water. The thermal storage devices 337, 339 store thermal energy generate by the first sides 326, 336 of the first and second thermoelectric modules 324, 334. A bypass line 346 and a double switching valve 348 are connected to the first circuit 312 and are configured to selectively prevent the first medium from receiving any thermal energy from thermal storage devices 337, 339.

Connected to the first and third circuits 312, 316 are heat exchangers 350, 352, both of which are used to condition (heat or cool) air to be provided to the occupant compartment of the vehicle. Accordingly, approximate to the heat exchangers 350, 352 is a blower 354. As indicated by the arrow 356, the blower 354 moves air through and across the heat exchangers 350, 352 before moving the air into the occupant compartment of the vehicle.

An internal combustion engine 358 is operatively coupled with the third circuit 316 such that the third medium is circulated by the pump 322 and is used to cool the engine 358. Preferably, the third circuit 316 has a radiator 360, for cooling the third medium within the third circuit 316. A bypass line 362 and a double switching valve 364 are connected to the third circuit 316 such that the double switching valve 362 can selectively direct the first medium through the bypass line 364 instead of the radiator 360. By circulating the third medium through the bypass line 364 instead of the radiator 360, the third medium can be heated more quickly by the engine 358 because the radiator 360 will not have an opportunity to cool the third medium.

The third circuit 316 may also have an additional bypass line 366 and double switching valve 368. The double switching valve 368 can selectively direct the third medium through the second bypass line 366 (during cooling mode operation) instead of through a section of the third circuit that is in thermal contact with the heat exchangers 332, 342. By circulating the third medium through the bypass line 366, the third medium will be unable to transfer heat to the heat exchangers 332, 342, and thus air provided by the blower 354 will not be heated by the entire 358 by the heat exchanger 352. Additionally, the temperature of the cool surfaces 328, 338 of the first and second thermoelectric modules 324, 334 will not be affected by the third medium. This can be advantageous when the HVAC is cooling the occupant compartment of the vehicle.

Generally, the third circuit 316 will have a branch circuit 370 having its own pump 372, valve 324 and heat exchanger 376. The branch circuit 370 is used to supplement the cooling of a portion of the third medium. For example, when the valve 374 is configured to allow a portion of the third medium to flow through the branch circuit 370, the heat exchanger 376 of the branch circuit 370 will aid in the cooling of the third medium. Conversely, when the valve 374 is configured to prevent the third medium from circulating through the branch circuit 370, the heat exchanger 376 will not supplement the cooling of the third medium.

A HVAC control system 378 is in electrical communication with the first and second thermoelectric modules 324, 334 via lines 380, 382, respectively. The HVAC control system 378 provides the first thermoelectric module 324 with an electric current. The HVAC control system 378 can adjust the amount of current, and the direction of the flow of the current, provided to the first thermoelectric module 324. In a heating mode, the direction of the current flowing through the first thermoelectric module 324 is such that as the hot surface 326 warms, the cool surface 228 cools. In a cooling mode, the reverse occurs with the "hot" surface 326 of the thermoelectric module 324 cools, while the "cool" surface 328 the first thermoelectric module 324 warms. As the hot surface 326 warms or cools, thermal energy is transferred from the hot surface 326 to the heat exchanger 330 via the first medium.

As stated previously, the HVAC control module 378 is also an electrical communication with the second thermoelectric module 334. The HVAC control system 378 is configured to receive an electrical pulse (as indicated by the arrow labeled 384). Preferably, the electrical pulse is generated by a hybrid-electrical vehicle during regenerative breaking. Electrical pulses received by the HVAC control system 378 may be directed to the second thermoelectric module 334 and/or an energy storage device 386, such as a capacitor. The HVAC control module 378 may direct the electrical pulse to either to the second thermoelectric module 334 and/or the energy storage device 386 based upon the thermal capacity of the high and low temperature thermal storage devices 337, 339 and/or the thermal needs of the occupant compartment of the hybrid-electric vehicle.

As the engine 358 warms up, the engine 358 heats the third medium that is circulated through the heat exchangers 332, 342. The heat of the third medium is passed through the heat exchangers 332, 342 to the cool surfaces of the first and second thermoelectric modules 324, 334. By warming the cool surfaces 328, 338 of the first and second thermoelectric modules 324, 334, the difference in temperature between the hot surfaces 226, 236 and cool surfaces 328, 338 will be minimized, allowing the first and second thermoelectric modules 324, 334 operate more efficiently.

In a cooling mode, the third medium is directed through the bypass line 366 by the double switching valve 368. By utilizing the bypass line 366, the heat of third medium is not directed through the heat exchangers 332, 342 and subsequently to the cool surfaces 328, 338 of the first and second thermoelectric modules 324, 334. The temperature of the cool surfaces 328, 338 of the thermoelectric modules will therefore not be heated, remaining closer in temperature to the hot surfaces 326, 336. As stated before, by having a low temperature differential between the hot surfaces 326, 336 and cool surfaces 328, 338, the first and second thermoelectric modules 324, 334 will operate more efficiently.

As thermal energy is transferred to the first and second mediums, the thermal energy or portion thereof from the first and second mediums will be stored in the thermal storage devices 337, 339. As the thermal storage devices 337, 339 stores more thermal energy, the HVAC control unit 378 may be able to reduce the amount of current flowing through the first thermoelectric device 324 because the occupant compartment of the vehicle will be able to be heated or cooled by the thermal energy stored within the thermal storage devices 337, 339.

By reducing the current demands of the first thermoelectric module 324, the hybrid-electric vehicle may be able to shut off its internal combustion engine and/or reduce the drain on the energy storage device 386, thereby increasing the fuel efficiency of the hybrid-electric vehicle.

As a person skilled in the art will readily appreciate, the above description is meant as an illustration of implementation of the principles of this invention. This description is not intended to limit the scope or application of this invention in that the invention is susceptible to modification, variation and change, without departing from spirit of this invention, as defined in the following claims.

The invention claimed is:

1. A heating and cooling system for a vehicle, the heating and cooling system comprising:
   a first thermoelectric module configured to receive a regenerative pulse, the first thermoelectric module having a first surface in thermal communication with a first heat exchanger; and
   at least one thermal storage device in thermal communication with the first surface of the first thermoelectric module, whereby the thermal storage device is configured to store at least a portion of the thermal energy generated by the first surface of the first thermoelectric module.

2. The system of claim 1, further comprising a second thermoelectric module configured to receive a current, the second thermoelectric module having a first surface in thermal communication with a third heat exchanger and a second surface in thermal communication with a fourth heat exchanger; and
   the first thermoelectric module having a second surface in communication with a second heat exchanger.

3. The system of claim 2, further comprising an energy storage device and a logic device configured to provide the regenerative pulse to one of the first thermoelectric module and the at least one energy storage device.

4. The system of claim 2, further comprising a first fluid circuit having a first pump for circulating a first medium therethrough, the first fluid circuit being in thermal communication with the second and fourth heat exchangers.

5. The system of claim 4, further comprising a first fluid circuit heat exchanger in thermal communication with the first medium.

6. The system of claim 2, further comprising a blower configured to move air across and through at least one heat exchanger.

7. The system of claim 1, further comprising a second fluid circuit having a second pump for circulating a second medium therethrough, the second fluid circuit being in thermal communication with the first heat exchanger.

8. The system of claim 7, further comprising a second fluid circuit heat exchanger in thermal communication with the second medium.

9. The system of claim 8, further comprising a blower configured to move air through the second circuit heat exchanger.

10. The system of claim 7, wherein the thermal storage device is in thermal communication with the second medium.

11. The system of claim 10, wherein the second fluid circuit further comprises an at least one bypass line and an at least one valve configured to selectively prevent the second medium from being in thermal communication with the thermal storage device.

12. The system of claim 2, further comprising a third fluid circuit having a third pump for circulating a third medium therethrough, the third circuit being in thermal communication with the fourth heat exchanger.

13. The system of claim 12, wherein at least one thermal storage device is in thermal communication with the third medium.

14. The system of claim 1, wherein the at least one thermal storage device includes an at least one liquid reservoir.

15. The system of claim 1, wherein the at least one thermal storage device includes at least phase change material.

16. The system of claim 15, wherein the phase change material further comprises a high temperature phase change material and low temperature phase change material.

17. The system of claim 1, wherein the first thermoelectric module is at least one thermoelectric module.

18. The system of claim 1, wherein the second thermoelectric module is at least one thermoelectric module.

* * * * *